(12) United States Patent
Yu

(10) Patent No.: US 10,243,641 B2
(45) Date of Patent: Mar. 26, 2019

(54) FRAME TRANSMITTING METHOD AND FRAME RECEIVING METHOD

(71) Applicant: NEWRACOM, INC., Irvine, CA (US)

(72) Inventor: Heejung Yu, Daegu (KR)

(73) Assignee: NEWRACOM, INC., Lake Forest, CA (US)

( * ) Notice: Subject to any disclaimer, the term of this patent is extended or adjusted under 35 U.S.C. 154(b) by 150 days.

(21) Appl. No.: 15/374,363

(22) Filed: Dec. 9, 2016

(65) Prior Publication Data

US 2017/0093478 A1 Mar. 30, 2017

Related U.S. Application Data

(63) Continuation of application No. 14/875,505, filed on Oct. 5, 2015, now Pat. No. 9,553,699, which is a (Continued)

(30) Foreign Application Priority Data

Aug. 28, 2014 (KR) ........................ 10-2014-0113391

(51) Int. Cl.
*H04W 4/00* (2018.01)
*H04B 7/06* (2006.01)
(Continued)

(52) U.S. Cl.
CPC ............. *H04B 7/0684* (2013.01); *H04L 5/00* (2013.01); *H04L 27/18* (2013.01);
(Continued)

(58) Field of Classification Search
CPC ...... H04B 7/12; H04B 7/0667; H04B 7/0684; H04L 1/0625; H04L 5/0007;
(Continued)

(56) References Cited

U.S. PATENT DOCUMENTS 8,345,534 B1 1/2013 Narasimhan et al.
8,693,560 B2 4/2014 Shimezawa et al.
(Continued)

FOREIGN PATENT DOCUMENTS

WO   2006060780 A1   6/2006
WO   2008097038 A2   8/2008
(Continued)

OTHER PUBLICATIONS

Extended European Search Report for European Patent Application No. 15836488.5, dated Mar. 19, 2018.
(Continued)

*Primary Examiner* — Harun Chowdhury

(57) ABSTRACT

A method of transmitting a frame by a device in a wireless communication network is provided. The device generates a first symbol having a first subcarrier spacing where a symbol duration of the first symbol, excluding a guard interval, has a first length. The device generates a second symbol having a second subcarrier spacing narrower than the first subcarrier spacing wherein a symbol duration of the second symbol, excluding a guard interval, has a second length that is twice the first length. The device transmits a frame including the first symbol and the second symbol.

14 Claims, 21 Drawing Sheets

Related U.S. Application Data continuation of application No. PCT/US2015/047304, filed on Aug. 27, 2015.

(51) Int. Cl.
| | |
|---|---|
| *H04L 5/00* | (2006.01) |
| *H04L 27/26* | (2006.01) |
| *H04L 27/18* | (2006.01) |
| *H04L 29/06* | (2006.01) |
| *H04W 84/12* | (2009.01) |
| *H04L 25/02* | (2006.01) |

(52) U.S. Cl.
CPC ...... *H04L 27/2602* (2013.01); *H04L 27/2626* (2013.01); *H04L 27/2628* (2013.01); *H04L 69/22* (2013.01); *H04L 25/0202* (2013.01); *H04W 84/12* (2013.01)

(58) Field of Classification Search
CPC .............. H04L 25/0202; H04L 27/2613; H04L 25/0206; H04L 27/2602; H04L 27/2628; H04L 27/34; H04L 69/22; H04W 72/0446; H04W 84/12
USPC ........ 370/210, 328, 329, 252, 338; 375/295, 375/299
See application file for complete search history.

(56) References Cited

U.S. PATENT DOCUMENTS

| | | | | |
|---|---|---|---|---|
| 2005/0276347 | A1* | 12/2005 | Mujtaba | ............... H04B 7/0667 375/299 |
| 2006/0250943 | A1* | 11/2006 | Mujtaba | ................... H04B 7/12 370/210 |
| 2007/0165514 | A1 | 7/2007 | Akita | |
| 2013/0121243 | A1 | 5/2013 | Vermani et al. | |
| 2013/0195002 | A1 | 8/2013 | Walker et al. | |
| 2013/0286938 | A1* | 10/2013 | Porat | ................... H04L 27/2613 370/328 |
| 2015/0326408 | A1* | 11/2015 | Vermani | ............... H04L 1/0625 370/328 |
| 2015/0327276 | A1* | 11/2015 | Rebeiz | ............. H04W 72/0493 370/329 |
| 2015/0365257 | A1* | 12/2015 | Suh | ........................ H04L 27/261 375/295 |
| 2017/0171010 | A1* | 6/2017 | Qu | ........................ H04L 27/34 |

FOREIGN PATENT DOCUMENTS

| | | |
|---|---|---|
| WO | 2009062115 A2 | 5/2009 |
| WO | 2010138921 A2 | 12/2010 |
| WO | WO 2011/108832 A2 | 9/2011 |

OTHER PUBLICATIONS

International Search Report and Written Opinion for PCT/US2015/047304, filed Aug. 27, 2015

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11 ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

FIG. 28

| | L-SIG | HE-SIG-A | HE-SIG-A | HE-STF |
|---|---|---|---|---|
HE
BPSK  BPSK  BPSK  QBPSK

FIG. 29

| | L-SIG | HE-SIG-A | HE-SIG-A | HE-STF | HE-STF |
|---|---|---|---|---|---|
HE
BPSK  BPSK  BPSK  QBPSK  QBPSK

FIG. 30

| | L-SIG | HE-SIG-A | HE-SIG-A | HE-SIG-A |
|---|---|---|---|---|
HE
BPSK  BPSK  BPSK  QBPSK

FRAME TRANSMITTING METHOD AND FRAME RECEIVING METHOD

CROSS-REFERENCE TO RELATED APPLICATION

This application is a continuation of U.S. patent application Ser. No. 14/875,505, filed on Oct. 5, 2015, now U.S. Pat. No. 9,553,699, issued Jan. 24, 2017, which is a continuation of International Patent Application No. PCT/US15/47304, filed Aug. 27, 2015, which claims priority to and the benefit of Korean Patent Application No. 10-2014-0113391, filed on Aug. 28, 2014, in the Korean Intellectual Property Office, the entire contents of which are incorporated herein by reference

BACKGROUND (a) Field

The described technology relates generally to a frame transmitting method and a frame receiving method. More particularly, the described technology generally relates to a frame transmitting method and a frame receiving method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 2.4 GHz band was published in 1999, and the IEEE standard 802.11g (IEEE Std 802.11g-2003) supporting 5 GHz band was published in 2003. These standards are called legacy. Subsequently, the IEEE standard 802.11n (IEEE Std 802.11n-2009) for enhancements for higher throughput (HT) was published in 2009, and the IEEE standard 802.11ac (IEEE 802.11ac-2013) for enhancements for very high throughput (VHT) was published in 2013.

Recently, the WLAN has been considered for use as a network for covering a wide area in an outdoor environment. Accordingly, a high efficiency (HE) WLAN suitable for the outdoor environment is being developed by the IEEE 802.11ax task group. In order to be suitable for the outdoor environment, a length of a guard interval provided by a cyclic prefix may be lengthened, so a length of a symbol may be lengthened. Accordingly, the length of the symbol in the HE WLAN or a subsequent WLAN may be lengthened.

SUMMARY OF THE INVENTION

An embodiment of the present disclosure provides a frame transmitting method and a frame receiving method for increasing a length of a symbol.

According to an embodiment, a method of transmitting a frame is provided by a device in a wireless communication network. The method includes generating a first symbol having a first subcarrier spacing, generating a second symbol having a second subcarrier spacing narrower than the first subcarrier spacing, and transmitting a frame including the first symbol and the second symbol. A symbol duration of the first symbol, excluding a guard interval, has a first length, and a symbol duration of the second symbol, excluding a guard interval, has a second length that is twice the first length.

The first length may be 3.2 μs and the second length may be 6.4 μs.

Generating the second symbol may include performing an inverse Fourier transform by using only even-numbered subcarriers among the plurality of subcarriers, and using only one period of two periods that are output by the inverse Fourier transform.

The method may further include generating a third symbol, a symbol duration of the third symbol, excluding a guard interval, has a third length that is twice the second length. The frame may further include the third symbol.

The third length may be 12.8 μs.

The frame may include a legacy preamble part, a HE (high efficiency) long training field that follows the legacy preamble part and is adapted for use in channel estimation, and a data field. The legacy preamble part may include the first symbol, the HE long training field may include the second symbol, and the data field may include the third symbol.

When a basic bandwidth of the frame is divided into a plurality of subbands, the data field may be encoded per each subband and transmitted, and the data field transmitted on subband may include data for a receiving device allocated to the subband.

The frame may further include a first HE signal field and a second HE signal field that both follow the legacy preamble part. The second HE signal field may be encoded per the basic bandwidth and transmitted, and may include allocation information of the subbands.

The second HE signal field may further include information on devices that receive the frame on each subband.

The basic bandwidth may be 20 MHz.

The legacy preamble part may further include a legacy signal field, and two symbols that immediately follow the legacy signal field may be modulated by using BPSK (binary phase shift keying) modulation.

According to yet another embodiment, a method of receiving a frame is provided by a device in a wireless communication network. The method includes detecting in a frame a first symbol having a first subcarrier spacing and a second symbol having a second subcarrier spacing narrower than the first subcarrier spacing, and processing the first symbol and the second symbol in the frame. A symbol duration of the first symbol, excluding a guard interval, has a first length and a symbol duration of the second symbol, excluding a guard interval, has a second length that is twice the first length.

Processing the first symbol and the second symbol may include performing a Fourier transform on the first symbol by using a fast Fourier transform (FFT) having a first size, and performing a Fourier transform on the second symbol by using an FFT having a second size different from the first size.

The second size may be four times the first size. Performing the Fourier transform on the second symbol may include generating an interval having two periods by copying an interval excluding a guard interval from the second symbol, and performing the Fourier transform on the interval having the two periods.

The first length may be 3.2 μs and the second length may be 6.4 μs.

The frame may further include a third symbol, a symbol duration of the third symbol, excluding a guard interval, has a third length that is twice the second length.

The frame may include a legacy preamble part, a long training field that follows the legacy preamble part and is adapted for use in channel estimation, and a data field. The legacy preamble part may include the first symbol, the long training field may include the second symbol, and the data field may include the third symbol.

The frame may further include a first HE signal field and a second HE signal field that both follow the legacy preamble part. When a basic bandwidth of the frame is divided into a plurality of subbands, the data field may be encoded per a subband unit and transmitted on a subband of the plurality of subbands. Further, the second HE signal field may be encoded per the basic bandwidth and transmitted, and may include allocation information for the subbands.

The second HE signal field may further include information on devices that receive the frame on each subband.

The legacy preamble part may further include a legacy signal field, and two symbols that immediately follow the legacy signal field may be modulated by using BPSK modulation.

According to still another embodiment, an apparatus for transmitting a frame is provided in a wireless communication network. The apparatus includes a processor and a transceiver. The processor generates a first symbol having a first subcarrier spacing and generates a second symbol having a second subcarrier spacing narrower than the first subcarrier spacing. The transceiver transmits a frame including the first symbol and the second symbol. A symbol duration of the first symbol, excluding a guard interval, has a first length, and a symbol duration of the second symbol, excluding a guard interval, has a second length that is twice the first length.

According to a further embodiment, an apparatus for receiving a frame is provided in a wireless communication network. The apparatus includes a processor and a transceiver. The transceiver detects in a frame a first symbol having a first subcarrier spacing and a second symbol having second subcarrier spacing narrower than the first subcarrier spacing. The processor processes the first symbol and the second symbol in the frame. A symbol duration of the first symbol, excluding a guard interval, has a first length and a symbol duration of the second symbol, excluding a guard interval, has a second length that is twice the first length.

BRIEF DESCRIPTION OF THE DRAWINGS

FIG. 28, FIG. 29, and FIG. 30 each illustrates an auto-detection method of a HE frame in a wireless communication network according to an embodiment.

DETAILED DESCRIPTION OF EMBODIMENTS

Figure 1:
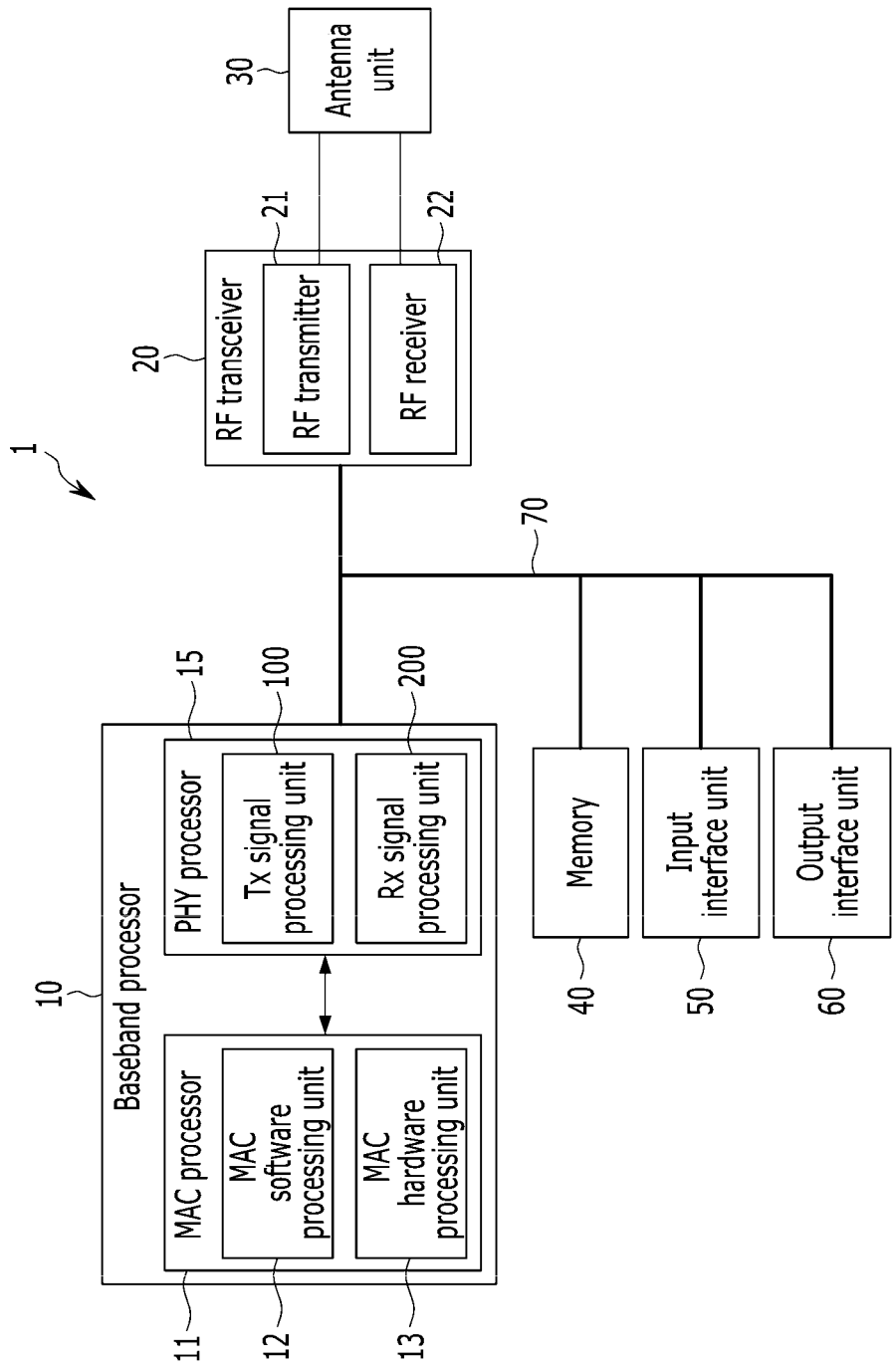
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STAs may be collectively called STAs. However, for ease of description, herein, only the non-AP STAs are referred to as the STAs.

FIG. 1 is a schematic block diagram of a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement some functions of the MAC layer, and the MAC hardware processing unit 13 may implement remaining functions of the MAC layer as hardware (hereinafter referred to "MAC hardware"). However, embodiments of the MAC processor 11 are not limited to this.

The PHY processor 15 includes a transmitting (Tx) signal processing unit 100 and a receiving (Rx) signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
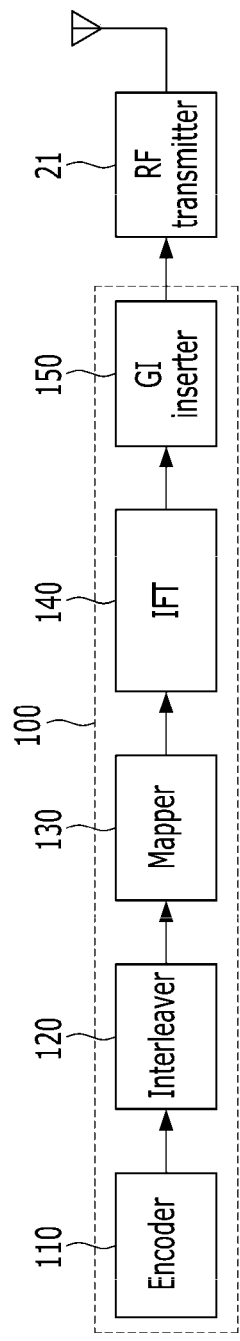
FIG. 2 is a schematic block diagram of a transmitting signal processor in an embodiment suitable for use in a WLAN.

FIG. 2 is a schematic block diagram of a transmitting signal processor 100 according to an embodiment suitable for use in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
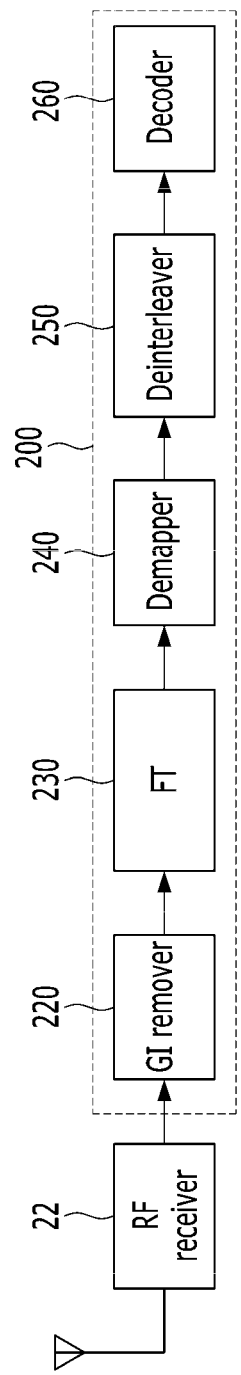
FIG. 3 is a schematic block diagram of a receiving signal processing unit in an embodiment suitable for use in the WLAN.

FIG. 3 is a schematic block diagram of a receiving signal processing unit 200 according to an embodiment suitable for use in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
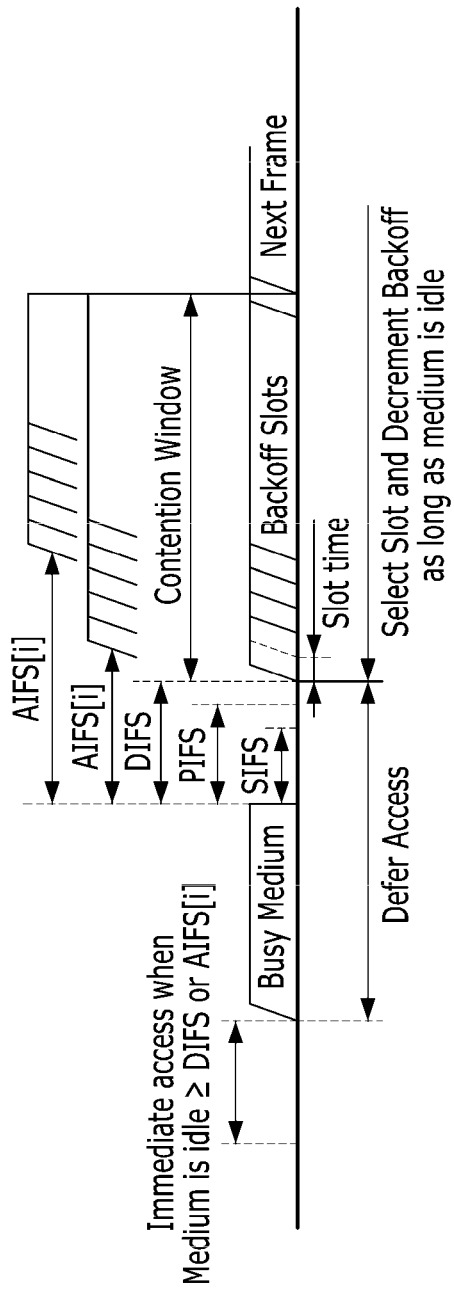
FIG. 4 illustrates Inter-Frame Space (IFS) relationships.

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of the previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
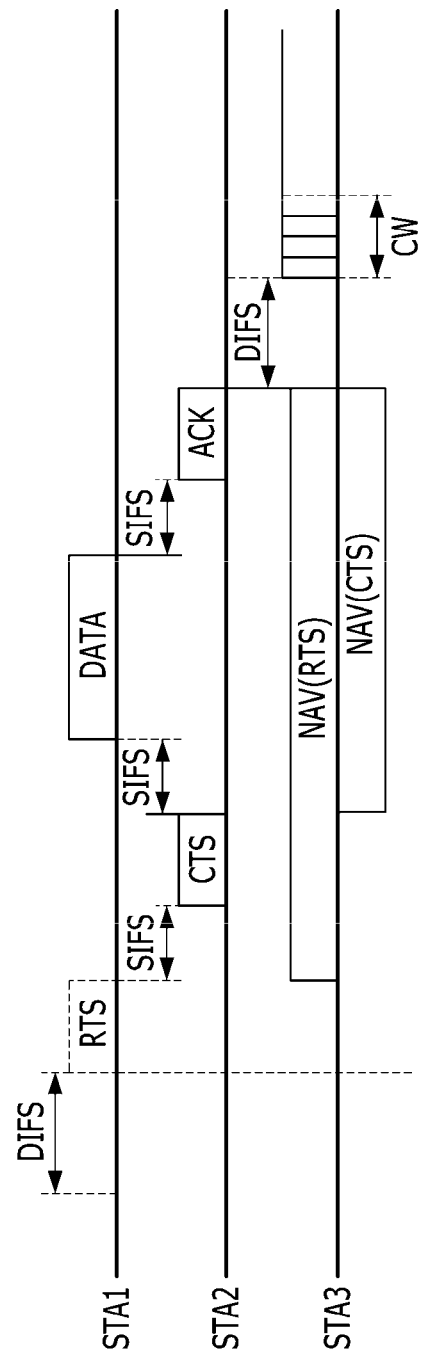
FIG. 5 is a schematic diagram illustrating a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device STA3.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames by using duration information included in the RTS frame. For example, the NAV timer may be set for a duration of SIFS+CTS frame duration+RFS+data frame duration+SIFS+ACK frame duration. When the STA3 receives the CTS frame, it may set the NAV timer for a transmission duration of subsequently transmitted frames by using duration information included in the CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after a SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Now, a frame transmitting method and a frame receiving method in a wireless communication network according to an embodiment is described with reference to the drawings. A wireless communication network according to an embodiment may be a WLAN. Particularly, the wireless communication network according to an embodiment may be a high efficiency (HE) WLAN developed by the IEEE 802.11ax task group. Hereinafter, it is assumed for convenience that the wireless communication network according to an embodiment is a HE WLAN.

Figure 6:
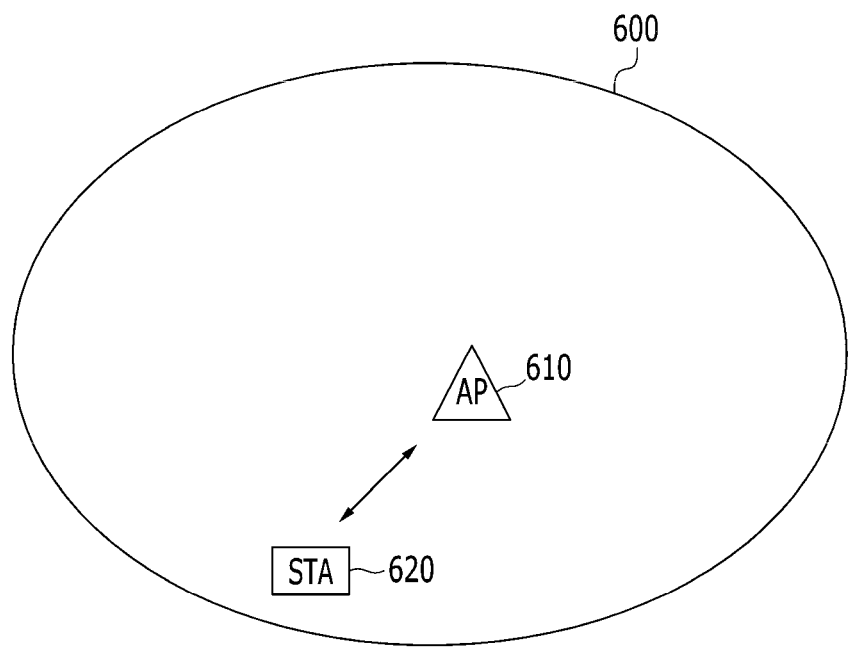
FIG. 6 shows an example of a wireless communication network according to an embodiment.
Figure 7:
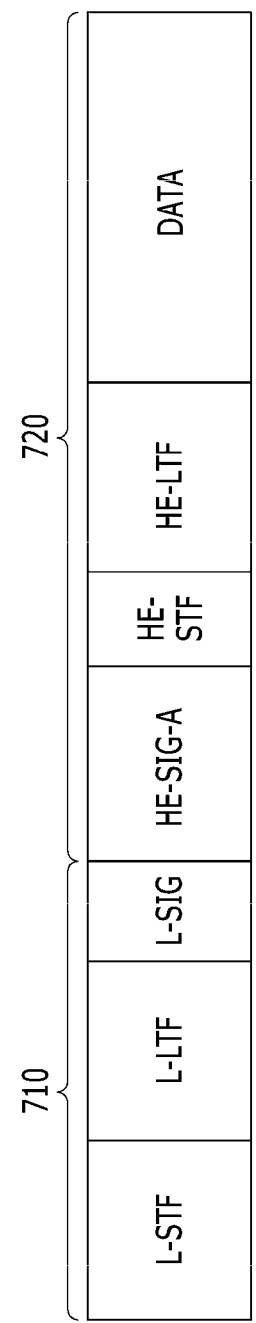
FIG. 7 schematically shows an example of a frame format of a wireless communication network according to an embodiment.

FIG. 6 shows an example of a wireless communication network according to an embodiment, and FIG. 7 schematically shows an example of a frame format of a wireless communication network according to an embodiment.

Referring to FIG. 6, a basic service set (BSS) 600 includes a plurality of WLAN devices. The plurality of WLAN devices include an access point (AP) 610 and a non-AP station, i.e., a station 620

The AP 610 and the station 620 are devices supporting a wireless communication network according to an embodiment, e.g., a HE WLAN. Hereinafter, such a device is referred to as a HE device. Further, an AP supporting the HE WLAN is referred to as a HE-AP, and a station supporting the HE WLAN is referred to as a HE-STA.

The BSS 600 may further include a previous version device. The previous version device may be, for example, a device (hereinafter referred to as a "legacy device") supporting the IEEE standard 802.11a or 802.11g (IEEE Std 802.11a-1999 or IEEE Std 802.11g-2003), a device (hereinafter referred to as an "HT device") supporting the IEEE standard 802.11n (IEEE Std 802.11n-2009) for enhancements for higher throughput (HT), or a device (hereinafter referred to as a "VHT device") supporting the IEEE standard 802.11ac (IEEE Std 802.11ac-2013) for enhancements for very high throughput (VHT).

Referring to FIG. 7, a frame according to an embodiment includes a legacy preamble part 710 and a part supporting a wireless communication network according to an embodiment, for example a HE compatible part 720. The frame shown in FIG. 7 may be a physical layer (PHY) frame, for example a physical layer convergence procedure (PLCP) frame. Further, the frame shown in FIG. 7 may be a downlink frame transmitted by the AP or an uplink frame transmitted by the station.

The legacy preamble part 710 includes a legacy preamble for backward compatibility with previous version WLAN devices. The legacy preamble includes a legacy short training field (L-STF), a legacy long training field (L-LTF), and a legacy signal field (L-SIG). The L-STF may be used for initial synchronization, signal detection, and automatic gain control. The L-LTF may be used for fine frequency synchronization and channel estimation. The L-SIG may include signaling information such as length information representing a length of the entire frame.

The HE compatible part 720 includes a HE preamble and a data field. The data field includes data to be transmitted, and the data may correspond to a MAC frame.

The HE preamble includes a HE signal field (HE-SIG-A) following the L-SIG and carrying signaling information for a HE device. The length information of the L-SIG and the signaling information of the HE-SIG-A may be decoded based on the channel information estimated by the L-LTF. The HE preamble may further include an additional HE signal field (HE-SIG-B).

The HE preamble may further include a HE long training field (HE-LTF). The HE-LTF may be used for channel estimation of the HE compatible part 720. The HE-LTF may include a plurality of HE-LTFs. Each of the HE-LTFs may correspond to one symbol, for example, an orthogonal frequency division multiplexing (OFDM) symbol. The data, i.e., the MAC frame part of the data field, may be decoded using the channel information estimated using the HE-LTF.

In some embodiments, the HE-LTF may be used for multiple input multiple output (MIMO) channel estimation. The number of HE-LTFs may be determined based on the number of antennas used for the MIMO transmission, i.e., the number of space-time streams.

The HE preamble may further include a HE short training field (HE-STF). The HE-STF may be used for automatic gain control of the HE compatible part 720 and may correspond to one symbol. The HE-STF may precede the HE-LTF.

A second HE signal field (HE-SIG-B) (not shown) may follow the HE-LTF, or may follow the HE-SIG-A.

In some embodiments, a basic bandwidth may be divided into a plurality of subbands to enhance frequency usage efficiency in the HE WLAN. For this, the HE WLAN may use a transmission scheme such as an orthogonal frequency-division multiple access (OFDMA) scheme. Further, the HE WLAN may be considered for use in an outdoor environment. However, when a guard interval (GI) of the previous WLAN, that is, a WLAN based on a previous WLAN standard, is used in the outdoor environment, the performance can be degraded because a length of the GI, for example 800 nsec, is short. Accordingly, in an embodiment, the GI may be lengthened such that a symbol (i.e., an OFDM symbol) may be lengthened.

Hereinafter, such an embodiment is described with reference to FIG. 8 to FIG. 15.

Figure 8:
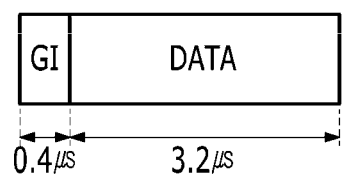
FIG. 8 and FIG. 9 illustrate a 64-point Fast Fourier Transform (FFT) symbol in a wireless communication network according to various embodiments.
Figure 9:
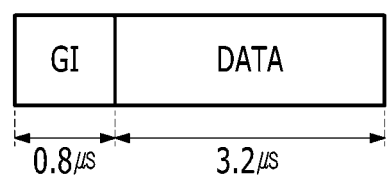
Figure 10:
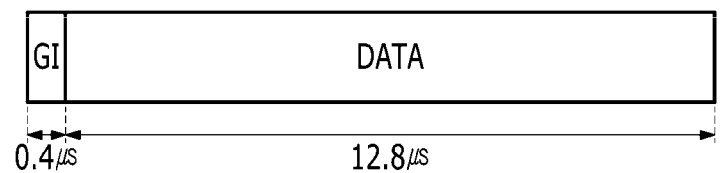
FIG. 10, FIG. 11, FIG. 12, and FIG. 13 illustrate a 256-point FFT symbol in a wireless communication network according to various embodiments.
Figure 11:
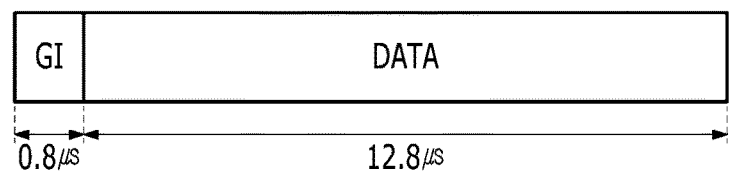
Figure 12:
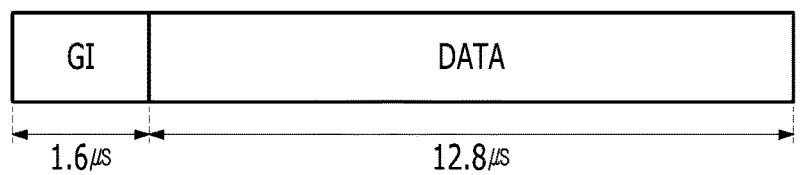
Figure 13:
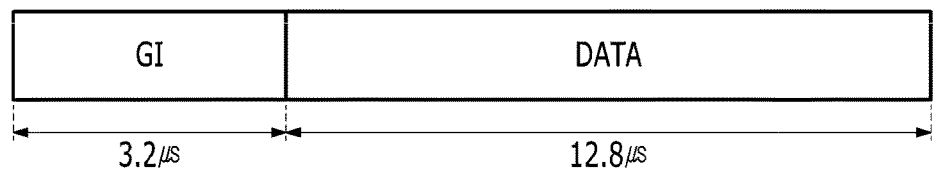

FIG. 8 and FIG. 9 illustrate a 64 point FFT symbol in a wireless communication network according to various embodiments, and FIG. 10, FIG. 11, FIG. 12, and FIG. 13 illustrate a 256 point FFT symbol in a wireless communication network according to various embodiments.

In an embodiment, subcarrier spacing is shortened to increase a length of an OFDM symbol. An FFT having a larger size than an FFT used in the previous WLAN (i.e., a legacy WLAN, an HT WLAN, or a VHT WLAN) is used.

In some embodiments, the subcarrier spacing that is applied to symbols of a legacy preamble part (710 of FIG. 7) and a HE-SIG-A is equal to the subcarrier spacing of the previous WLAN, for backward compatibility with the previous WLAN standard. That is, an FFT having the same size as the previous WLAN is used. The FFT used in the previous WLAN may be a 64 point FFT on a 20 MHz basic bandwidth, wherein the subcarrier spacing used in the previous WLAN is 312.5 kHz(=20 MHz/64). Accordingly, 64 subcarriers per symbol can be used on the 20 MHz basic bandwidth. As shown in FIG. 8 and FIG. 9, each symbol of the legacy preamble part and the HE-SIG-A may include a data interval corresponding to an FFT period with 3.2 µs length and a GI that is prepended to the data interval and has the length of 0.4 µs or 0.8 µs. In an embodiment, the GI may be formed using a cyclic prefix (CP) of the data interval. In this case, a 0.4 µs GI may be called ⅛ CP since it is formed by the CP corresponding to ⅛ of 3.2 µs length. A 0.8 µs GI may be called ¼ CP since it is formed by the CP corresponding to ¼ of 3.2 µs length.

In a wireless communication network according to an embodiment, subcarrier spacing narrower than 312.5 kHz is applied to some fields including a data field in a HE compatible part (720 of FIG. 7). That is, an FFT that has a size larger than 64 FFT on the 20 MHz basic bandwidth is applied to some fields of the HE compatible part 720. For example, an inverse Fourier transformer (140 of FIG. 2) of a transmitting device may use the FFT having a size larger than a 64 point FFT when performing an IFFT, and a Fourier transformer (230 of FIG. 3) of a receiving device may use a FFT having a size larger than the 64 point FFT when performing a FFT.

In some embodiments, as shown in FIG. 10, FIG. 11, FIG. 12, and FIG. 13, a subcarrier spacing (i.e., 78.125 kHz) that corresponds to ¼ of the subcarrier spacing in the legacy preamble part and HE-SIG-A may be used in some fields of the HE compatible part 720. For this, an FFT with four times as many points as the FFT of the legacy preamble part (hereinafter, a four times FFT), i.e., a 256 FFT on the 20 MHz basic bandwidth, may be used. In this case, subcarrier spacing is 78.125 kHz(=20 MHz/256). Accordingly, 256 subcarriers per symbol can be used on the 20 MHz basic bandwidth. In this case, each symbol has a data interval corresponding to an FFT period of 12.8 µs. Accordingly, a length of symbol duration excluding the GI from each symbol in some or all fields of the HE compatible part becomes four times a length of symbol duration excluding the GI from each symbol in the legacy preamble part.

In one embodiment, the four times FFT of the legacy preamble part may be used in all fields of the HE compatible part 720 excluding the HE-SIG-A and HE-STF. In another embodiment, an FFT having the same size as the FFT of the legacy preamble part may be used in the HE-SIG-B.

The GI has 0.4 µs length at 1/32 CP, has 0.8 µs length at 1/16 CP, has 1.6 µs length at ⅛ CP, and has 3.2 µs length at ¼ CP. For example, when the ¼ CP is used, symbol duration is 16.0 µs. Accordingly, in the HE compatible part, the symbol can be lengthened and the GI can be lengthened on the same fractional CP basis, compared with the legacy preamble part.

A wireless communication network according to one embodiment may use any one GI among the GIs shown in FIG. 10, FIG. 11, FIG. 12, and FIG. 13 while using the 256 point FFT. A wireless communication network according to another embodiment may use at least two GIs among the GIs shown in FIG. 10, FIG. 11, FIG. 12, and FIG. 13. In this case, the wireless communication network may select a GI in accordance with a user, or may select a GI in accordance with a channel or network interference.

In some embodiments, a frame may include GI information indicating the selected GI duration or FFT size information indicating the selected FFT size (or subcarrier spacing information). In one embodiment, a signal field (for example, a HE-SIG-A shown in FIG. 7 or a HE-SIG-B (not shown)) of the frame may include the GI information or the FFT size information (or subcarrier spacing information). In another embodiment, a MAC header of a MAC frame included in a data field of the frame may include the GI information or the FFT size information (or subcarrier spacing information). The MAC frame may be a data frame, a control frame, or a management frame. A transmitting device can notify a receiving device of the length of the used GI duration or the used FFT size (or the used subcarrier spacing) through the GI information or the FFT size information (or the subcarrier spacing information). The receiving device can identify the length of the used GI duration or the used FFT size (or subcarrier spacing) through the GI information or the FFT size information (or the subcarrier spacing information) included in the frame.

If the 0.4 μs GI is used in the 256 point FFT, the average throughput can be improved by the short GI. For example, the average throughput may be improved by 21% by a 0.4 μs GI compared with the 3.2 μs GI. However, the short GI may be vulnerable in the outdoor environment. If the 0.8 μs GI is used, the average throughput can be improved by 17% compared with the 3.2 μs GI, but the performance can be degraded in the outdoor environment. The 1.6 μs GI may be fit for the outdoor environment, but may provide less than average throughput enhancement. The 3.2 μs GI may be best fit for the outdoor environment, but may provide no average throughput enhancement.

Therefore, in some embodiments, the 0.4 μs GI or 0.8 μs GI, i.e., 1/32 CP or 1/16 CP, may be used to enhance the average throughput, and the 1.6 μs GI or 3.2 μs GI, i.e., 1/8 CP or 1/4 CP, may be used for outdoor robustness.

A set of CPs allowed for the symbol having the subcarrier spacing of 78.125 kHz may include 1/32 CP, 1/16 CP, 1/8 CP, and 1/4 CP. In one embodiment, 1/32 CP may be excluded from the allowed set of CPs.

Particularly, when a field indicating the GI information has 1 bit, the GI information of 1 bit cannot represent which CP is used from among three or more CPs. Accordingly, in one embodiment, two CPs among the above four CPs may allowed for indoor transmission, and two CPs among the above four CPs may be allowed for outdoor transmission. Further, the set of CPs allowed for the indoor transmission may be different from the set of CPs allowed for the outdoor transmission. For example, in an embodiment, the set of CPs allowed for the indoor transmission may include 1/16 CP and 1/8 CP, and the set of CPs allowed for the outdoor transmission may include 1/8 CP and 1/4 CP.

In some embodiments, the signaling information may include an indoor/outdoor indication indicating the indoor transmission or the outdoor transmission. The indoor/outdoor indication may have 1 bit. In one embodiment, the signaling information may be transmitted through the HE-SIG-A.

In this case, a receiving device can identify the currently used CP based on a combination of a transmission scheme indicated by the indoor/outdoor indication and the GI information. For example, when the indoor/outdoor indication indicates indoor transmission and the GI information is set to 1, 1/16 CP may be indicated between 1/16 CP and 1/8 CP. When the indoor/outdoor indication indicates indoor transmission and the GI information is set to 0, 1/8 CP may be indicated between 1/16 CP and 1/8 CP. Further, when the indoor/outdoor indication indicates outdoor transmission and the GI information is set to 1, 1/8 CP may be indicated between 1/8 CP and 1/4 CP. When the indoor/outdoor indication indicates outdoor transmission and the GI information is set to 0, 1/4 CP may be indicated between 1/8 CP and 1/4 CP.

In some embodiments, the indoor/outdoor indication may be transmitted through a bit that is not used in the frame in the previous WLAN.

As such, the frame whose symbol is lengthened may be appropriate for use in the outdoor environment. However, as described above, the frame may include a plurality of long training fields (HE-LTFs) for the MIMO channel estimation. In this case, when a length of each of the plurality of HE-LTFs is increased by four times, the overhead may be increased by the HE-LTFs. Hereinafter, an embodiment for reducing the length of the HE-LTF is described.

Figure 14:
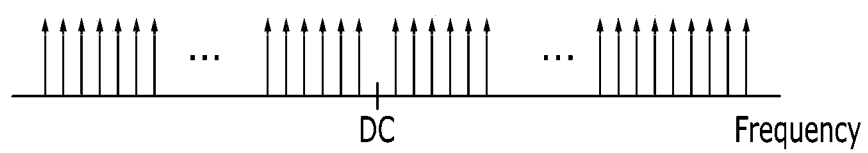
FIG. 14 illustrates a general subcarrier allocation in a wireless communication network according to an embodiment.
Figure 15:
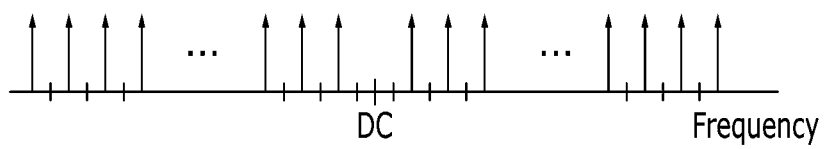
FIG. 15 illustrates a subcarrier allocation of a High Efficiency (HE) long training field (LTF) in a wireless communication network according to an embodiment.
Figure 16:
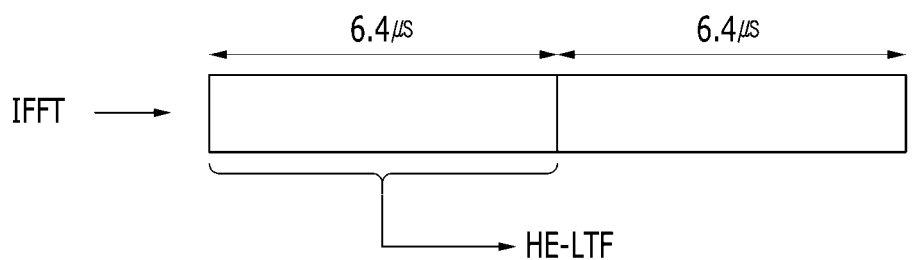
FIG. 16 illustrates generation of a HE long training field in a wireless communication network according to an embodiment.

FIG. 14 illustrates general subcarrier allocation in a wireless communication network according to an embodiment, FIG. 15 illustrates subcarrier allocation of a HE long training field in a wireless communication network according to an embodiment, and FIG. 16 illustrates generation of a HE long training field in a wireless communication network according to an embodiment.

As shown in FIG. 14, a symbol in a frequency domain may be disposed on a plurality of subcarriers. When a 256 point FFT is applied to a 20 MHz bandwidth, the symbol may be disposed on 256 subcarriers. When the 20 MHz bandwidth is divided into a plurality of subbands and the 256 FFT is applied to the 5 MHz subband, the symbol may be disposed on 64 subcarriers. When the 256 FFT is applied to the 10 MHz subband, the symbol may be disposed on 128 subcarriers.

A center subcarrier among the plurality of subcarriers may be used as a DC (direct current) tone. An index of the center subcarrier used as the DC tone is 0. Some subcarriers that are disposed on both sides of the DC tone whose index is 0 may be also used as DC tones. Some subcarriers that are disposed on both ends from the DC tone ins the center may be used as guard tones. Remaining subcarriers that exclude the DC tones and the guard tones from entire subcarriers may be used as data tones. When pilots are transmitted, some of the data tones may be used as pilot tones for transmitting the pilots.

Referring to FIG. 15, in one embodiment, values for a HE long training field (HE-LTF), for example, non-zero values, may be allocated to even-numbered subcarriers and zeros, i.e., null values, may be allocated to odd-numbered subcarriers, among a plurality of subcarriers in the HE-LTF. That is, the values for the HE-LTF may be allocated to tones whose indices are [±2, ±4, ±6, . . . ], and zeros may be allocated to tones whose indices are [±1, ±3, ±5, . . . ]. In another embodiment, the values for the HE-LTF may be allocated to the odd-numbered subcarriers and zeros may be allocated to the even-numbered subcarriers. Some of the odd-numbered subcarriers or of the even-numbered subcarriers may not be used, instead may be used for DC tones or guard tones. As such, when an inverse Fourier transformer (140 of FIG. 2) performs an inverse Fourier transform, for example an IFFT, after the values are allocated to the subcarriers, a waveform of 12.8 μs length where a waveform of 6.4 μs length (excluding the GI) is repeated twice is output. That is, a waveform having a 6.4 μs period is output in two periods per symbol. In an embodiment, only one period is transmitted as the HE-LTF among the two periods per symbol.

As such, although the four times FFT is used, the length of symbol duration excluding the GI from each symbol of the HE-LTF can be twice the length of the symbol duration excluding the GI from each symbol of the legacy preamble part. Accordingly, the overhead by the HT-LTF can be reduced.

In one embodiment, since the length of the symbol duration excluding the GI from each symbol of the HE-LTF is 6.4 µs but the 256 FFT is applied to the LTF on the 20 MHz basic bandwidth, subcarrier spacing in 256 subcarriers may be 78.125 kHz.

In another embodiment, since the zeros, i.e., null values, are inserted into the odd-numbered subcarriers among 256 subcarriers, it can be interpreted that only the even-numbered subcarriers exist in the HE-LTF among the 256 subcarriers. In an embodiment where only the even-numbered subcarriers exist in the HE-LTF, the subcarrier spacing may be 156.25 kHz, which is twice of 78.125 kHz.

In yet another embodiment, when the length of the symbol duration excluding the GI from each symbol is 6.4 µs and the subcarrier spacing is 156.25 kHz(=20 MHz/128) in the HE-LTF, two times FFT of the legacy preamble part, i.e., a 128 point FFT on the 20 MHz basic bandwidth, may be applied to the HE-LTF.

In some embodiments, the GI prepended to each symbol of the HE-LTF may be selected from a set including 0.4 µs, 0.8 µs, 1.6 µs, and 3.2 µs. In one embodiment, 0.4 µs may be excluded from the set. In one embodiment, the GI may be selected as any one of 1.6 µs and 3.2 µs to fit to the outdoor environment. For example, the GI may be 3.2 µs. In this case, each symbol of the HE-LTF has 9.6 µs length. Alternatively, when the length of the GI is 1.6 µs, each symbol of the HE-LTF has 8.0 µs length.

In some embodiments, since the four times FFT is used in some fields including a data field of the HE compatible part, a length of symbol duration excluding a GI from each symbol is 12.8 µs. The GI prepended to each symbol may be selected from a set including 0.4 µs, 0.8 µs, 1.6 µs, and 3.2 µs. In one embodiment, 0.4 µs may be excluded from the set. In one embodiment, the GI may be selected as any one of 1.6 µs and 3.2 µs to fit to the outdoor environment. For example, the GI may be 3.2 µs. In this case, each symbol of the data field has 16.0 µs length.

In some embodiments, an FFT having the same size as the legacy preamble part may be applied to a HE short training field (HE-STF), for automatic gain control. Therefore, the HE-STF may have subcarrier spacing of 312.5 kHz, and a length of symbol duration excluding the GI may be 3.2 µs. When ¼ CP is used, a GI may be 0.8 µs. In another embodiment, the HE-STF may be generated in the manner described for the HE-LTF relative to FIG. 15 such that a length of symbol duration excluding a GI from a symbol of the HE-STF is twice a length of symbol duration excluding the GI from the symbol of the legacy preamble part. That is, the 256 point FFT may be applied to the HE-STF on the 20 MHz basic bandwidth, and the HE-STF may use only one period of two periods that are output by allocating values to only even-numbered (or, in another embodiment, odd-numbered) subcarriers among a plurality of subcarriers. The length of symbol duration excluding the GI may be 6.4 µs and the GI may have 1.6 µs length in a case of ¼ CP. That is, a length of the entire symbol duration is 8.0 µs. In a case that the GI has 3.2 µs length, the length of the entire symbol duration in the HE-STF may be 9.6 µs.

Next, various frame formats in a wireless communication network according to an embodiment are described.

Figure 17:
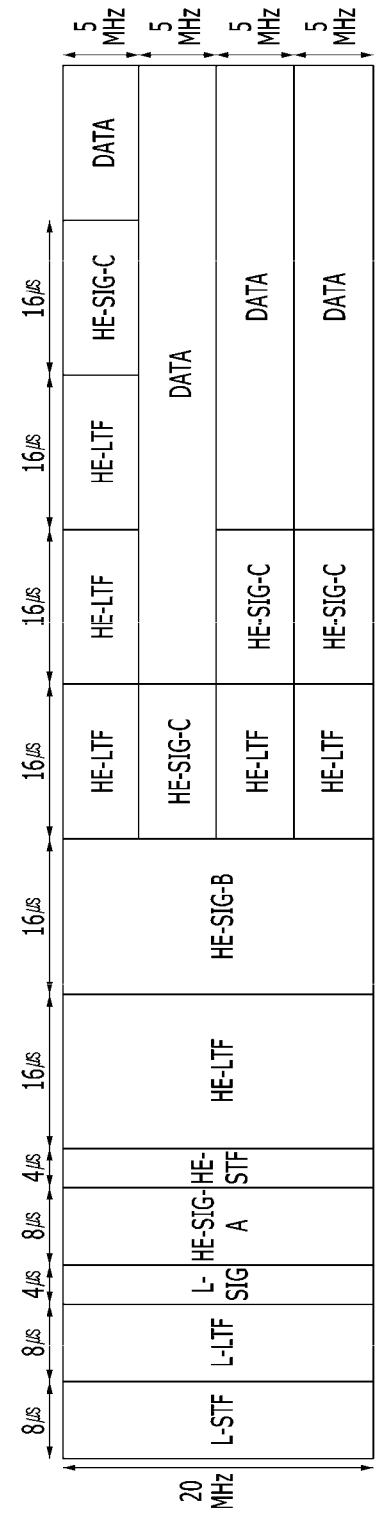
FIG. 17, FIG. 18, FIG. 21, and FIG. 22 each schematically illustrates a frame format in a wireless communication network according to various embodiments.
Figure 18:
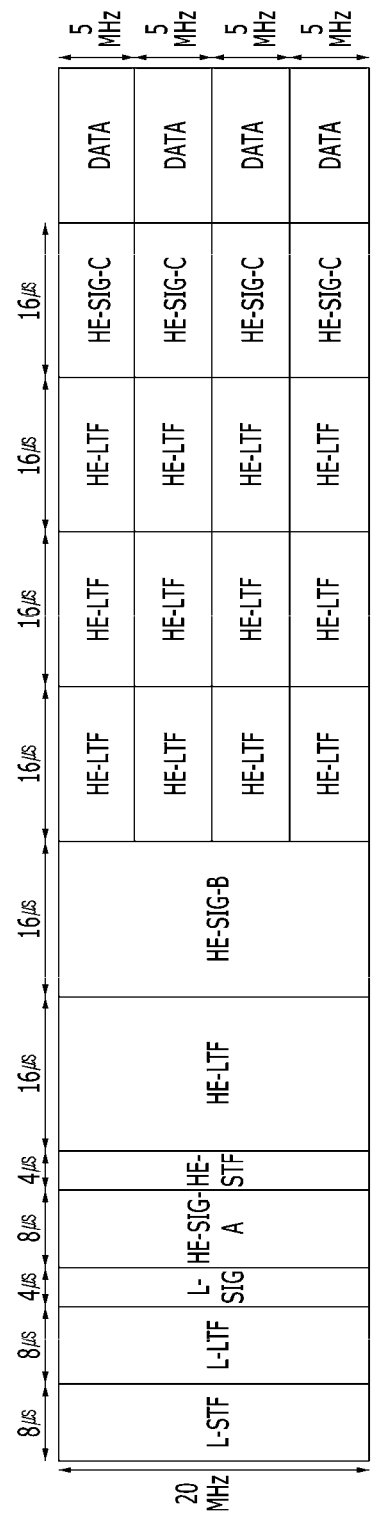
Figure 19:
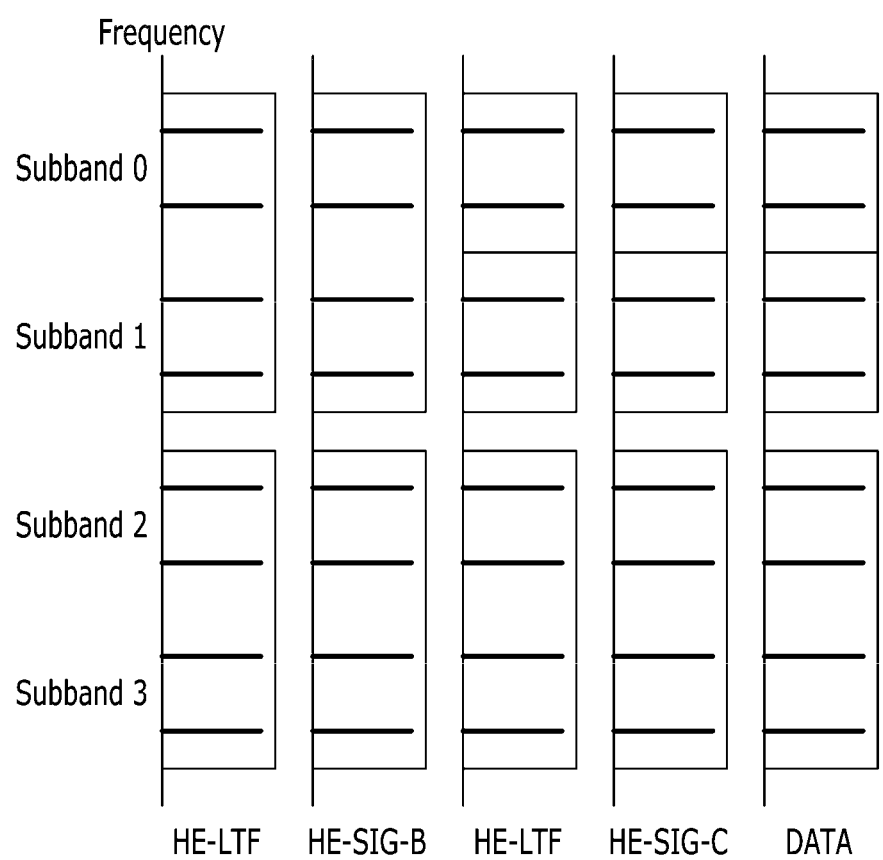
FIG. 19 and FIG. 20 show examples of subcarrier allocation in a frame format shown in FIG. 17 according to an embodiment.
Figure 20:
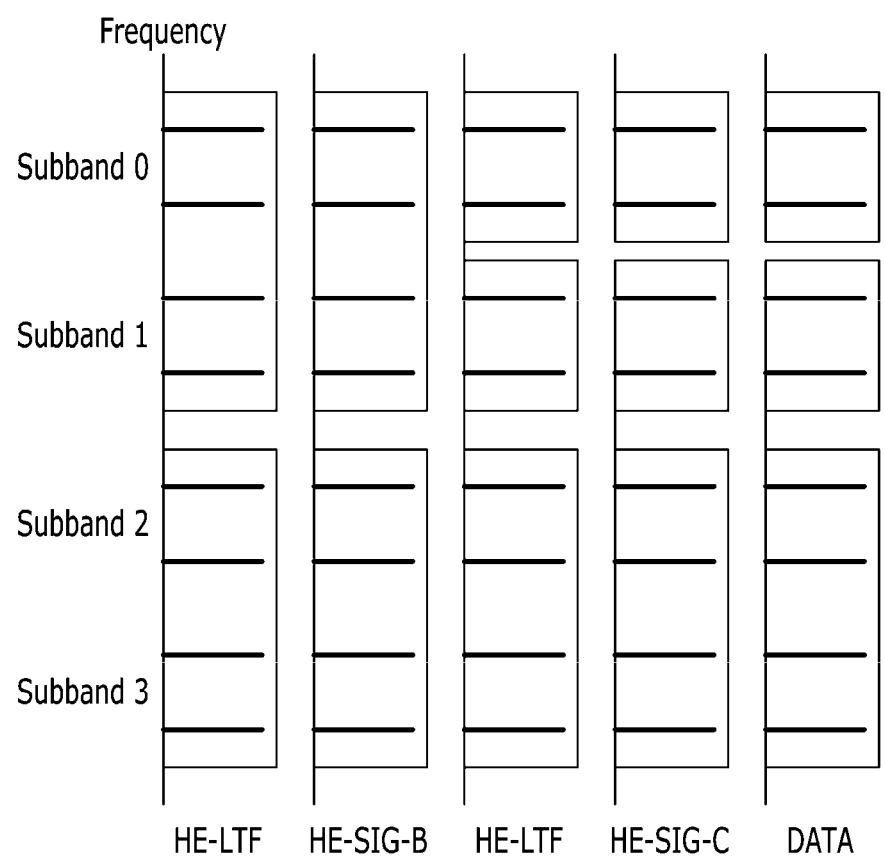

FIG. 17, FIG. 18, FIG. 21, and FIG. 22 each illustrates a frame format in a wireless communication network according to various embodiments, and FIG. 19 and FIG. 20 show examples of subcarrier allocation in a frame format shown in FIG. 17. It is assumed in FIG. 17, FIG. 18, FIG. 20, and FIG. 21 that a basic bandwidth, e.g., a 20 MHz bandwidth, is divided into four subbands of, e.g., 5 MHz.

Referring to FIG. 17, a frame includes a legacy preamble part and a HE compatible part. The legacy preamble part includes a legacy short training field (L-STF), a legacy long training field (L-LTF), and a legacy signal field (L-SIG). The HE compatible part includes a HE signal field (HE-SIG-A), a HE short training field (HE-STF), a HE long training field (HE-LTF), an additional HE signal field (HE-SIG-B), an additional HE long training field (HE-LTF), and a data field.

When the basic bandwidth is divided into a plurality of subbands, a plurality of subbands may be allocated to a plurality of devices.

For the compatibility with the previous WLAN, the L-STF, the L-LTF, and the L-SIG of the legacy preamble part and the HE-SIG-A of the HE compatible part are not transmitted on each subband but are transmitted by being encoded by a basic bandwidth unit, e.g., the 20 MHz band unit. In some embodiments, the HE-SIG-B may be also transmitted by being encoded by the 20 MHz band unit. Further, the HE-STF used for the automatic gain control may be also transmitted by being encoded by the 20 MHz band unit.

The data field may be transmitted by being encoded by the subband unit, and a data field transmitted by being encoded by the subband unit may include data for an allocated device. When lengths of data transmitted on the plurality of subbands are different, pad bits may be added to the data field of the subband having the short data lengths such that the lengths of data transmitted on the plurality of subbands are the same.

In some embodiments, the HE-LTFs may include the first HE-LTF that is transmitted on the 20 MHz band without being divided into the plurality of subbands and the additional HE-LTF that is transmitted on each subband. The number of HE-LTFs transmitted on each subband may be determined based on the number of data streams, i.e., space-time streams transmitted on the corresponding subband. In the example shown in FIG. 17, the number of HE-LTFs for the first subband (including the HE-LTF transmitted by being encoded by the 20 MHz band unit) is four, the number of HE-LTFs for the second subband is one, and the number of HE-LTFs for the third and fourth subbands is two. The HE-LTFs for each subband correspond to the first HE-LTF and the additional HE-LTF transmitted on the corresponding subband. The HE-LTFs of each subband may have a predetermined pattern, and the predetermined pattern may be set to guarantee orthogonality among the plurality of subbands.

In some embodiments, the number of HE-LTFs may be the same for all of the subbands. That is, as shown in FIG. 18, the number of HE-LTFs for other subbands may be determined according to the number of HE-LTFs for a subband having the greatest number of space-time streams.

The HE-SIG-A may carry common signaling information. The HE-SIG-B may carry allocation information for the subbands. That is, the HE-SIG-B may include information representing which device is allocated to each subband. Accordingly, a device receiving a frame may identify a subband allocated to the device from the HE-SIG-B and may interpret the HE-LTF and the data field of the allocated subband. The HE-SIG-B may further include information on occupancy time of each subband.

In some embodiments, the HE-SIG-B may further include information on the number of space-time streams at the MIMO transmission for each subband. The number of HE-LTFs may be determined based on the number of space-time streams. The HE-SIG-B may further include scheduling information indicating whether a multi-user MIMO (MU-MIMO) scheme is used. The number of bits for information to be carried by the HE-SIG-B is increased as the number of subbands is increased. Accordingly, the number of bits included the HE-SIG-B may be flexibly adjusted by separating the HE-SIG-B from the HE-SIG-A.

In one embodiment, the HE-SIG-B may follow the first HE-LTF as shown in FIG. 17. In another embodiment, the HE-SIG-B may follow the HE-SIG-A. In this case, the additional HE-LTF may follow the first HE-LTF.

In some embodiments, the frame may further include an additional HE signal field (HE-SIG-C) transmitted on each subband. Accordingly, a device receiving the frame can interpret only the HE-SIG-C of the allocated subband. The HE-SIG-C may include information on a modulation and coding scheme (MCS) used in the corresponding subband and information on a data size of the corresponding subband. When the MU-MIMO is applied to the subband, the HE-SIG-C may include the MCS information and the data size information for each device to which the MU-MIMO is applied. The HE-SIG-C may further include a cyclic redundancy check (CRC). In an embodiment, the CRC may be calculated for a CRC check on the corresponding subband. Alternatively, the CRC may be calculated for the CRC check on all of the subbands in order to reduce the total number of CRC bits.

It is assumed in FIG. 17 that the first 5 MHz subband is allocated to one device (for example, device 0), the second 5 MHz subband is allocated to another device (for example, device 1), and 10 MHz of the third and fourth subbands is allocated to yet another device (for example, device 2). Since the third subband and the fourth subband are allocated to the same device, the additional HE-LTF, the HE-SIG-C, and the data field of the third subband may be duplicated to the fourth band.

In the legacy preamble part and the HE-SIG-A, the 64 point FFT is applied on the 20 MHz basic bandwidth and the GI of 0.8 µs is attached to each symbol, like the previous WLAN. Accordingly, each of the L-STF and the L-LTF uses two symbols and has a length of 8 µs. The L-SIG uses one symbol and has a length of 4 µs. The HE-SIG-A may use two symbols like an HT signal field (HT-SIG) of the HT WLAN or a VHT signal field (VHT-SIG-A) of the VHT WLAN. In this case, the HE-SIG-A has a length of 8 µs.

The four times FFT is applied to the some fields in the HE compatible part excluding the HE-SIG-A. In one embodiment, the FFT of the legacy preamble part may be applied to the HE-STF for the automatic gain control, and the four times FFT may be applied to remaining fields. It is assumed that ¼ CP is used as the GI in all of these fields.

Then, the HE-STF of one symbol has a length of 4 µs, and each symbol of the HE-LTFs has a length of 16 µs. Further, each of the HE-SIG-B and the HE-SIG-C has a length of 16 µs when using one symbol.

As such, the frame shown in FIG. 17 or FIG. 18 can be suitably used in the outdoor environment because the lengths of the symbol and the GI are increased in some fields of the HE compatible part.

Referring to FIG. 19, the first HE-LTF and the HE-SIG-B transmitted on entire subbands use subcarriers from the 20 MHz bandwidth excluding subcarriers used as DC tones and subcarriers used as guard tones. Pilot tones may be allocated to some of the subcarriers of the first HE-LTF and the HE-SIG-B. FIG. 19 shows an example in which eight pilot tones are allocated.

In the additional HE-LTF, the HE-SIG-C, and the data field that are transmitted for each subband, subcarriers may be allocated for each user. Pilot tones may be allocated to some of the subcarriers.

In some embodiments, such as shown in FIG. 20, a guard band may be formed between the subbands allocated to the different users. That is, some subcarriers may be used as guard tones. Since the third and fourth subbands (subbands 2 and 3) are allocated to the same user, the guard bands may be formed between the first and second subbands (subbands 0 and 1) and between the second and third subbands (subbands 1 and 2), but no guard band may be formed between the third and fourth subbands (subbands 2 and 3), as shown in FIG. 20.

A frame where the guard band is formed between the subbands allocated to the different users may be adapted for use in an uplink transmission.

Figure 21:
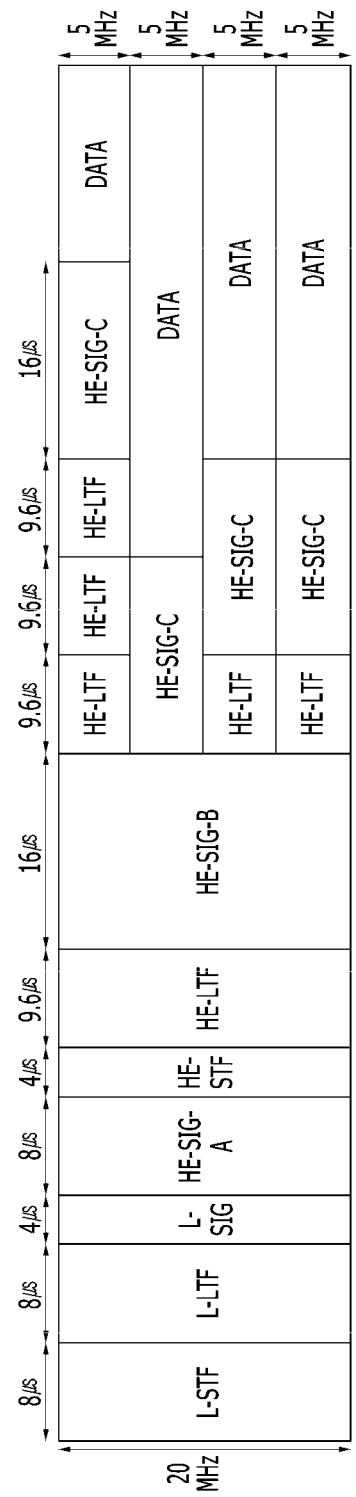

According to embodiments illustrated in FIG. 17 and FIG. 18, because lengths of the plurality of HE-LTFs included in the frame are increased by a factor of four, the overhead may be increased by the HE-LTFs. Therefore, in another embodiment, as shown in FIG. 21, values for the HE-LTF, for example non-zero values, may be allocated to even-numbered subcarriers and zeros may be allocated to odd-numbered subcarriers, among a plurality of subcarriers in the HE-LTF. That is, the values for the HE-LTF may be allocated to tones whose indices are [±2, ±4, ±6, . . . ], and zeros may be allocated to tones whose indices are [±1, ±3, ±5, . . . ]. In another embodiment, the values for the HE-LTF may be allocated to the odd-numbered subcarriers and zeros may be allocated to the even-numbered subcarriers.

As such, when an inverse Fourier transformer (140 of FIG. 2) performs an inverse Fourier transform, for example an IFFT, after the values are allocated to the subcarriers, a waveform of 12.8 µs length wherein a waveform of 6.4 µs length is repeated twice is output. That is, a waveform having a 6.4 µs period is output within two periods per symbol. Only one period is transmitted as the HE-LTF among the two periods per symbol. Then, a length of symbol duration excluding a GI is 6.4 µs in the HE-LTF. If ¼ CP is used, the GI has a 1.6 µs length and the length of the entire symbol duration is 8.0 µs. Alternatively, if the GI has a 1.6 µs length as shown in FIG. 21, the length of the entire symbol duration is 9.6 µs.

In one embodiment, since the length of the symbol duration excluding the GI from each symbol of the HE-LTF is 6.4 µs but the 256 FFT is applied to the HE-LTF on the 20 MHz basic bandwidth, subcarrier spacing in 256 subcarriers may be 78.125 kHz.

In another embodiment, since the zeros, i.e., null values, are inserted into the odd-numbered subcarriers among 256 subcarriers, it can be interpreted that only the even-numbered subcarriers exist in the HE-LTF among the 256 subcarriers. In an embodiment where only the even-numbered subcarriers exist in the HE-LTF, the subcarrier spacing may be 156.25 kHz, which is twice of 78.125 kHz.

In yet another embodiment, when the length of the symbol duration excluding the GI from each symbol is 6.4 µs and the subcarrier spacing is 156.25 kHz in the HE-LTF, two times FFT of the legacy preamble part, i.e., a 128 point FFT on the 20 MHz basic bandwidth, may be applied to the HE-LTF.

As such, the length of symbol duration excluding the GI from each symbol of the HE-LTF is reduced by half compared with FIG. 17 and FIG. 18. Accordingly, the overhead of the HE-LTF can be decreased.

While a case modifying the frame described with reference to FIG. 17 has been illustrated in FIG. 21, the frame described with reference to FIG. 18 may be modified in the same way.

Figure 22:
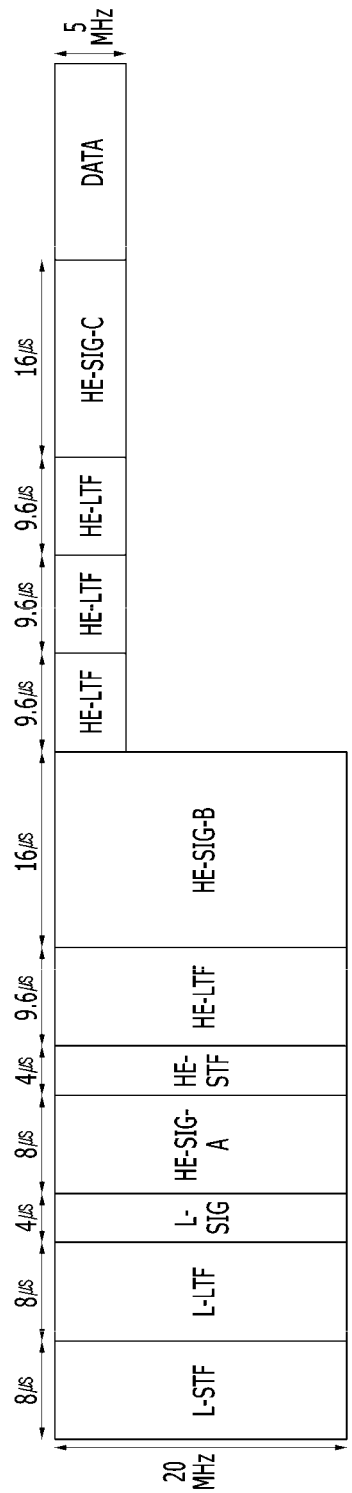

As shown in FIG. 22, a frame may be transmitted in an uplink transmission as illustrated in FIG. 17, FIG. 18, and FIG. 21. FIG. 22 illustrates an embodiment in which a frame illustrated in FIG. 21 is used for the uplink transmission.

For example, when device 0 is allocated the first subband, device 0 may transmit the L-STF, the L-LTF, the L-SIG, the HE-SIG-A, the HE-STF, the first HE-LTF, and the HE-SIG-B through the 20 MHz band, and may transmit the additional HE-LTF and the data field through the first subband.

While the frame transmission on the 20 MHz bandwidth has been described above, a frame according to an embodiment may be applied to a 20 MHz or more bandwidth. For example, in some embodiments, a 40 MHz bandwidth transmission, a 60 MHz bandwidth transmission, or an 80 MHz bandwidth transmission may be performed by combining the 20 MHz bandwidths. Hereinafter, such embodiments are described with reference to FIG. 23 and FIG. 24.

Figure 23:
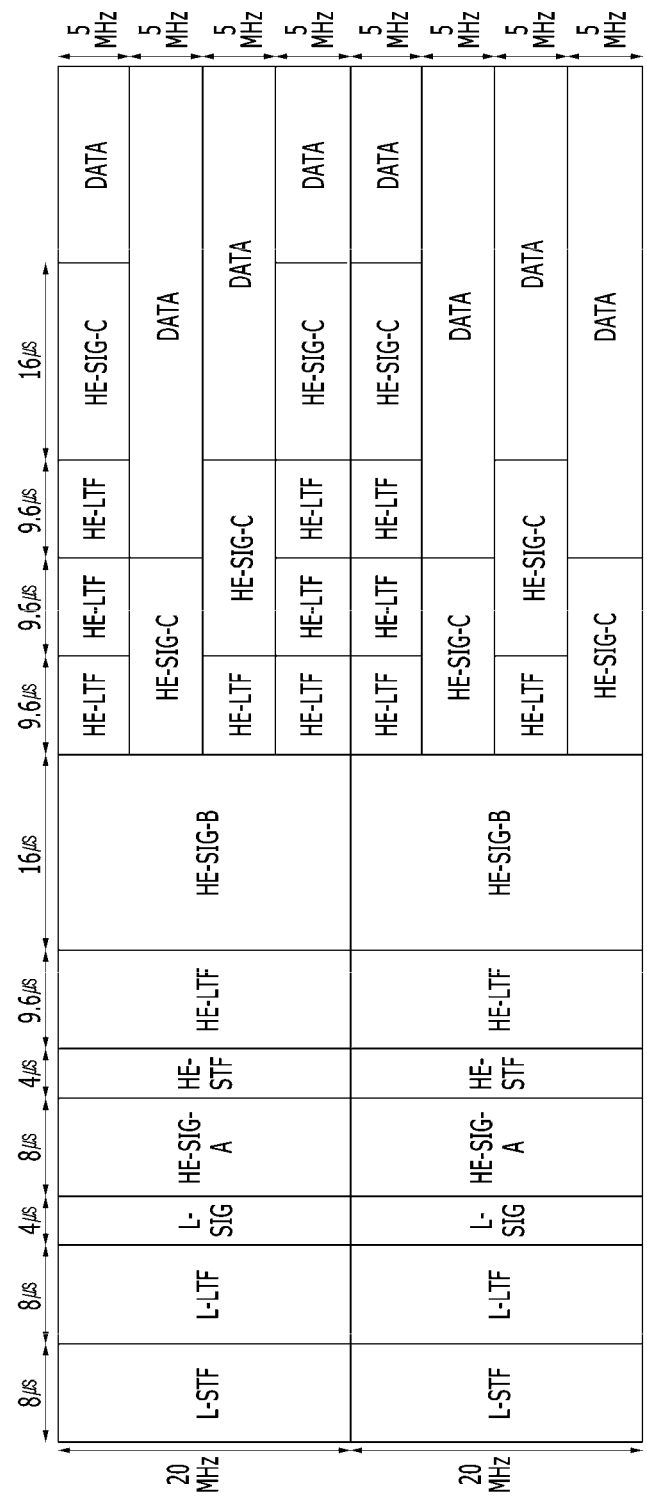
FIG. 23 and FIG. 24 schematically illustrate a frame format in a wireless communication network according to various embodiments.
Figure 24:
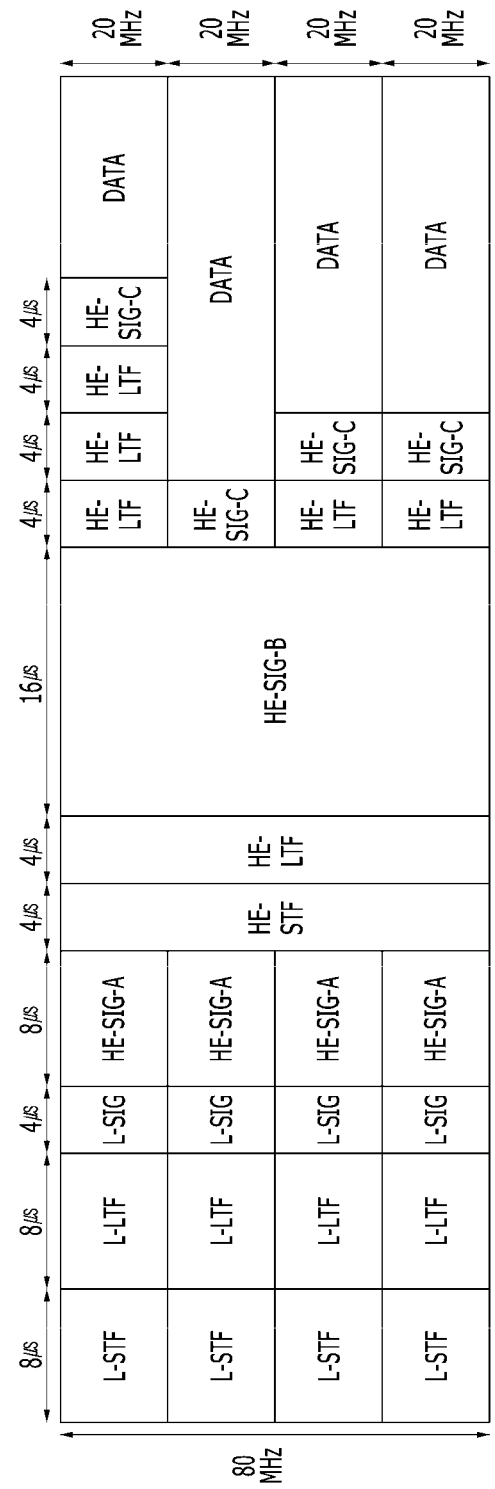

FIG. 23 and FIG. 24 schematically illustrating a frame format in a wireless communication network according to various embodiments. It is assumed that an entire bandwidth is 40 MHz in FIG. 23 and an entire bandwidth is 80 MHz in FIG. 24.

Referring to FIG. 23, a frame includes a legacy preamble part for each band having a basic bandwidth (for example, 20 MHz). In this case, a legacy short training field (L-STF), a legacy long training field (L-LTF), a legacy signal field (L-SIG), and a HE signal field (HE-SIG-A) of one 20 MHz band are duplicated to the other 20 MHz band.

A HE short training field (HE-STF), a HE long training field (HE-LTF), and an additional HE signal field (HE-SIG-B) of a HE compatible part may be transmitted on the entire bandwidth (for example, 40 MHz). Alternatively, the HE-STF, the HE-LTF, and the HE-SIG-B may be transmitted on each 20 MHz. In this case, the HE-STF, the HE-LTF, and the HE-SIG-B of one 20 MHz band are duplicated to the other 20 MHz band.

An additional HE long training field (HT-LTF), an additional HE signal field (HE-SIG-C), and a data field are transmitted on each subband. It is assumed in FIG. 23 that each 20 MHz band is divided into four 5 MHz subbands.

As describe above, the four times FFT may applied to some fields of the HE compatible part, for example the HE compatible part excluding the HE-SIG-A and the HE-STF. In some embodiments, the HE-LTF may use only even-numbered subcarriers.

As such, when a 256 FFT is applied on the 20 MHz basic bandwidth, that is, when 256 subcarriers are used on the 20 MHz basic bandwidth, a problem may occur when a VHT device detects a mid-packet.

The VHT WLAN uses a multi-channel by using secondary channels together with a primary channel. That is, the VHT WLAN uses the primary channel of 20 MHz for a 20 MHz bandwidth transmission, uses the primary channel of 20 MHz and a secondary channel of 20 MHz for a 40 MHz bandwidth, and uses the primary channel of 20 MHz, the secondary channel of 20 MHz, and a secondary channel of 40 MHz for an 80 MHz bandwidth transmission.

The VHT device may detect whether a transmission from a neighbor BSS is a transmission that does not occupy its primary channel and occupies its secondary channel. This detection is called a mid-packet detection. The VHT device uses the mid-packet detection for clear channel assessment (CCA) of the secondary channel. In this case, the VHT device may perform the mid-packet detection on the secondary channel by receiving the frame shown in FIG. 23. However, in the frame shown in FIG. 23, a symbol length of the HE compatible part is different from a symbol length by recognized the VHT device, i.e., a symbol length used in the VHT WLAN. Therefore, the GI that is used for the mid-packet detection by the VHT device cannot be a repetition of an end in an OFDM symbol. As a result, a problem may occur at the mid-packet detection by the VHT device, so the compatibility with the VHT device may not be maintained.

Since the mid-packet detection is performed on the secondary channel, in some embodiments, the frame format that increases the symbol length in some or all fields of the HE compatible part may be used when only the 20 MHz band of the primary channel is used, that is, when the secondary channels are not used, in order to maintain the compatibility with the VHT device within the same BSS. Accordingly, the frame format that increases the symbol length in some or all fields of the HE compatible part may not be used when a transmission is performed through bands including the secondary channel, so that compatibility with the VHT device can be maintained.

For example, a frame may be transmitted through an 80 MHz band as shown in FIG. 24. The frame includes a legacy preamble part for each band having a basic bandwidth (for example, 20 MHz). In this case, a legacy short training field (L-STF), a legacy long training field (L-LTF), a legacy signal field (L-SIG), and a HE signal field (HE-SIG-A) of one 20 MHz band are duplicated to the other 20 MHz bands.

A HE short training field (HE-STF), a HE long training field (HE-LTF), and an additional HE signal field (HE-SIG-B) of a HE compatible part may be transmitted on the entire bandwidth (for example, 80 MHz). In another embodiment, the HE-STF, the HE-LTF, and the HE-SIG-B may be transmitted on each 20 MHz band. In this case, the HE-STF, the HE-LTF, and the HE-SIG-B of one 20 MHz band are duplicated to the other 20 MHz bands.

An additional HE long training field (HT-LTF), an additional HE signal field (HE-SIG-C), and a data field are transmitted on each subband. In the example shown in FIG. 24 the 80 MHz bandwidth is divided into four 20 MHz subbands.

Since the 80 MHz bandwidth includes a secondary channel, a 64 point FFT may be applied to all fields of the frame on the 20 MHz basic bandwidth for compatibility with the VHT device. It is assumed in FIG. 24 that the number of symbols is four in the HE-SIG-B.

Embodiments of the WLAN supports backward compatibility with a previous version device. Accordingly, frames of various formats may be used within a BSS. In this case, a HE device may detect whether the received frame is a legacy frame, an HT frame, a VHT frame, or an HT frame using a long OFDM symbol according to an embodiment. For this, an auto-detection scheme for detecting a frame format based on modulation schemes may be used.

Hereinafter, an auto-detection method in a wireless communication network according to an embodiment is described with reference to FIG. 25 to FIG. 30.

Figure 25:
FIG. 25 illustrates an auto-detection method of a legacy frame according to an embodiment.
Figure 26:
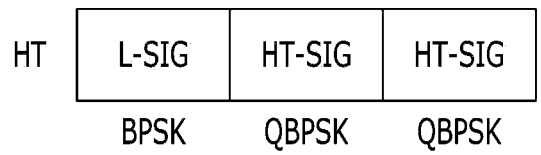
FIG. 26 illustrates an auto-detection method of an HT frame according to an embodiment.
Figure 27:
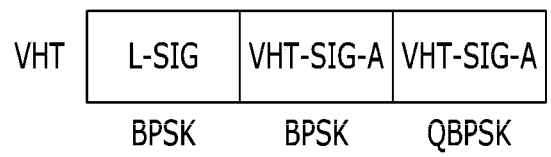
FIG. 27 illustrates an auto-detection method of a VHT frame according to an embodiment.

FIG. 25 illustrates an auto-detection method of a legacy frame, FIG. 26 illustrates an auto-detection method of an HT frame, FIG. 27 illustrates an auto-detection method of a VHT frame, and FIG. 28, FIG. 29, and FIG. 30 each illustrates an auto-detection method of a HE frame in a wireless communication network according to an embodiment.

As shown in FIG. 25, in a legacy frame, a symbol of a legacy signal field (L-SIG) is modulated by using a binary phase shift keying (BPSK) modulation, and a data field following the L-SIG is modulated by using various modulation schemes ranging from the BPSK modulation to a 64-point quadrature amplitude modulation (64-QAM). As shown in FIG. 26, in an HT frame, an HT signal field (HT-SIG) having two symbols follows the L-SIG modulated using the BPSK modulation. The two symbols of the HT-SIG are modulated using a quadrature binary phase shift keying (QBPSK) modulation having a different phase from the BPSK. As shown in FIG. 27, in a VHT frame, a VHT signal field (VHT-SIG-A) having two symbols follows the L-SIG modulated by using the BPSK modulation. The first symbol of the VHT-SIG-A is modulated by using the BPSK modulation and the second symbol of the VHT-SIG-A is modulated by using the QBPSK modulation.

Accordingly, a HE device may determine that the received frame is the HT frame when the first symbol following the L-SIG is modulated by using the QBPSK modulation, and may determine that the received frame is the VHT frame when the first symbol following the L-SIG is modulated by using the BPSK modulation and the second symbol is modulated by using the QBPSK modulation.

Referring to FIG. 28, according to one embodiment, in a HE frame, all of a symbol of the L-SIG and two symbols of a HE signal field (HE-SIG-A) following the L-SIG are modulated by using the BPSK modulation. Further, a symbol following the two symbols of the HE-SIG-A, for example a HE short training field (HE-STF), is modulated by using the QBPSK.

In another embodiment, the HE-STF may apply a 256 point FFT and use only even-numbered subcarriers such as was described above for a HE long training field (HE-LTF). As a result, a length of the HE-STF may be twice that of a symbol of the legacy preamble part. In this case, as shown in FIG. 29, the HE-STF corresponding to the length of two symbols may be modulated by using the QBPSK modulation.

In yet another embodiment, as shown in FIG. 30, a symbol following two symbols of the HE-SIG-A may be the third symbol of the HE-SIG-A. In this case, the third symbol of the HE-SIG-A may be modulated by using the QBPSK modulation.

Accordingly, the HE device may determine that the received frame is the HE frame when the first and second symbols following the L-SIG are modulated by using the BPSK modulation and the third symbol is modulated by using the QBPSK modulation.

As such, according to an embodiment, the HE device can automatically detect the frame format based on a combination of the BSPK and QBPSK modulations.

Next, a frame transmitting method and a frame receiving method in a wireless communication network according to an embodiment are described with reference to FIG. 31 and FIG. 32.

Figure 31:
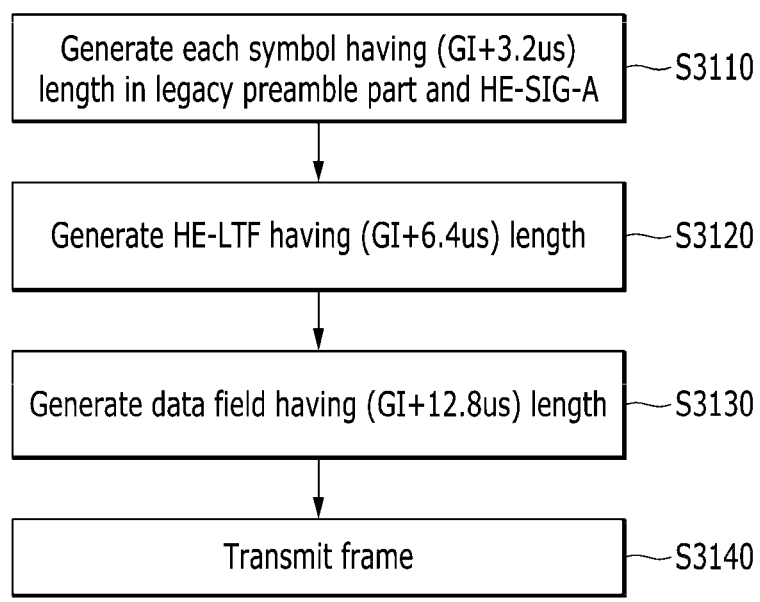
FIG. 31 is a flowchart illustrating a frame transmitting method in a wireless communication network according to an embodiment.
Figure 32:
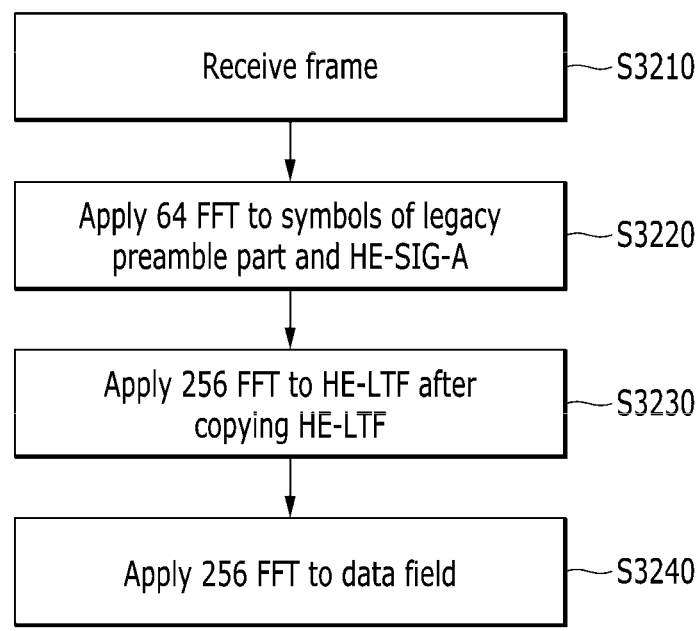
FIG. 32 is a flowchart illustrating a frame receiving method in a wireless communication network according to an embodiment.

FIG. 31 is a flowchart illustrating a frame transmitting method in a wireless communication network according to an embodiment, and FIG. 32 is a flowchart illustrating a frame receiving method in a wireless communication network according to an embodiment.

Referring to FIG. 31, a transmitting device generates symbols of a legacy preamble part and a HE signal field (HE-SIG-A) (S3110). The transmitting device performs an inverse Fourier transform to allow each symbol of the legacy preamble part and the HE-SIG-A to have subcarrier spacing of 312.5 kHz and a length of symbol duration (i.e., OFDM symbol duration) excluding a GI from each symbol to be 3.2 μs. A 64 point FFT may be applied to the inverse Fourier transform on a 20 MHz basic bandwidth.

The transmitting device generates a HE long training field (HE-LTF) of a HE compatible part (S3120). In one embodiment, the transmitting device performs the inverse Fourier transform to allow a symbol of the HE-LTF to have subcarrier spacing of 78.125 kHz, null values to be inserted into odd-numbered subcarriers, and a length of symbol duration excluding a GI from the symbol of the HE-LTF to be 6.4 μs. In this case, the transmitting device may perform the inverse Fourier transform by using only even-numbered subcarriers among a plurality of subcarriers, and may generate the symbol of the HE-LTF by using only one period of two periods that are output by the inverse Fourier transform. A 256 point FFT may be applied to the inverse Fourier transform on the 20 MHz basic bandwidth.

In another embodiment, because the odd-numbered subcarriers into which the null values are inserted can be interpreted as non-existing subcarriers, the transmitting device may perform the inverse Fourier transform to allow the symbol of the HE-LTF to have subcarrier spacing of 156.25 kHz and the length of OFDM symbol duration excluding the GI to be 6.4 μs. In this case, the transmitting device may perform the inverse Fourier transform on the HE-LTF by applying a 128 point FFT on the 20 MHz basic bandwidth.

The transmitting device generates a data field of the HE compatible part (S3130). The transmitting device performs the inverse Fourier transform to allow a symbol of the data field to have subcarrier spacing of 78.125 kHz and a length of symbol duration excluding a GI from the symbol to be 12.8 μs. The 256 point FFT may be applied to the inverse Fourier transform on the 20 MHz basic bandwidth.

In one embodiment, the transmitting device may perform the inverse Fourier transform to allow a symbol of the HE-STF to have subcarrier spacing of 312.5 kHz and a length of symbol duration excluding a GI from the symbol of the HE-STF to be 3.2 μs.

In another embodiment, the transmitting device may perform the inverse Fourier transform to allow the symbol of the HE-STF to have subcarrier spacing of 78.125 kHz and the length of symbol duration excluding the GI from the symbol of the HE-STF to be 6.4 μs.

In yet another embodiment, the transmitting device may perform the inverse Fourier transform to allow the symbol of the HE-STF to have subcarrier spacing of 78.125 kHz and the length of symbol duration excluding the GI from the symbol of the HE-STF to be 12.8 μs.

In one embodiment, the transmitting device may perform the inverse Fourier transform to allow a symbol of an additional HE signal field (HE-SIG-B) to have subcarrier spacing of 312.5 kHz and a length of an interval excluding a GI from the symbol of the HE-SIG-B to be 3.2 μs.

In another embodiment, the transmitting device may perform the inverse Fourier transform to allow the symbol of the HE-SIG-B to have subcarrier spacing of 78.125 kHz and the length of symbol duration excluding the GI from the symbol of the HE-SIG-B to be 12.8 μs.

Next, the transmitting device transmits a frame including the legacy preamble part and the HE compatible part (S3140).

While the steps S3110, S3120, and S3130 have been sequentially shown in FIG. 31, the steps S3110, S3120, and S3130 may be performed in a different order. Alternatively, at least two steps of the steps S3110, S3120, and S3130 may be performed at the same time.

Referring to FIG. 32, a receiving device in a frame including a legacy preamble part and a HE compatible part detects symbols of the legacy preamble part and the HE compatible part (S3210). Each symbol of the legacy preamble part and the HE signal field (HE-SIG-A) has subcarrier spacing of 312.5 kHz and a length of an interval excluding a GI from each symbol is 3.2 μs.

In an embodiment, a symbol of a HE long training field (HE-LTF) in the HE compatible part has subcarrier spacing of 78.125 kHz, null values are inserted into odd-numbered subcarriers in the symbol of the HE-LTF, and a length of symbol duration excluding a GI from the symbol of the HE-LTF is 6.4 μs.

In another embodiment, the symbol of the HE-LTF may have subcarrier spacing of 156.25 kHz and the length of symbol duration excluding the GI may be 6.4 μs. A symbol of a data field in the HE compatible part has subcarrier spacing of 78.125 kHz and a length of symbol duration excluding a GI from the symbol is 12.8 μs.

In one embodiment, a symbol of a HE short training field (HE-STF) in the HE compatible part may have subcarrier spacing of 312.5 kHz and a length of symbol duration excluding a GI from the symbol of the HE-STF may be 3.2 μs.

In another embodiment, the symbol of the HE-STF may have subcarrier spacing of 78.125 kHz and the length of symbol duration excluding the GI from the symbol of the HE-STF may be 6.4 μs.

In yet another embodiment, the symbol of the HE-STF may have subcarrier spacing of 78.125 kHz and the length of symbol duration excluding the GI from the symbol of the HE-STF may be 12.8 μs.

In one embodiment, a symbol of an additional HE signal field (HE-SIG-B) in the HE compatible part may have subcarrier spacing of 312.5 kHz and a length of symbol duration excluding a GI from the symbol of the HE-SIG-B may be 3.2 μs.

In another embodiment, the symbol of the HE-SIG-B may have subcarrier spacing of 78.125 kHz and the length of symbol duration excluding the GI from the symbol of the HE-STF may be 12.8 μs.

The receiving device processes the symbols in the received frame (S3220, S3230, and S3240).

In some embodiments, the receiving device performs a Fourier transform on the symbol of the legacy preamble part (S3220). A 64 point FFT may be applied to the Fourier transform on the 20 MHz basic bandwidth.

The receiving device performs a Fourier transform on the symbol of the HE-LTF of the HE compatible part (S3230). In one embodiment, the receiving device may, at the time of Fourier transform, copy an interval excluding a GI from the symbol of the HE-LTF, i.e., the interval having a length of 6.4 μs to generate an interval having two periods, and may apply a 256 point FFT to the interval having two periods on the 20 MHz basic bandwidth.

In another embodiment, the receiving device may, at the time of Fourier transform, apply a 128 point FFT to a symbol of the HE-LTF on the 20 MHz basic bandwidth.

The receiving device performs a Fourier transform on a symbol of a data field of the HE compatible part (S3240). The receiving device may apply the 256 point FFT to the symbol of the data field on the 20 MHz basic bandwidth.

In one embodiment, the receiving device may apply the 64 point FFT to a symbol of the HE-STF on the 20 MHz basic bandwidth. In another embodiment, the receiving device may process the HE-STF in the same way as the HE-LTF. In yet another embodiment, the receiving device may apply the 256 point FFT to the symbol of the HE-STF on the 20 MHz basic bandwidth.

In one embodiment, the receiving device may apply the 64 point FFT to a symbol of an additional HE signal field (HE-SIG-B) on the 20 MHz basic bandwidth. In another embodiment, the receiving device may apply the 256 point FFT to the symbol of the HE-SIG-B on the 20 MHz basic bandwidth.

While the steps S3220, S3230, and S3240 have been sequentially shown in FIG. 32, the steps S3220, S3230, and S3240 may be performed in a different order. Alternatively, at least two steps of the steps S3220, S3230, and S3240 may be performed at the same time.

A frame transmitting method and a frame receiving method according to above embodiments may be executed by a baseband processor 10 shown in FIG. 1 to FIG. 3. In one embodiment, instructions for executing the frame transmitting method and the frame receiving method according to above embodiments may be stored in a non-transitory computer-readable recording medium such as a memory 40. In another embodiment, at least some of the instructions may be MAC software. In yet another embodiment, at least some of the instructions may be transmitted from a non-transitory computer-readable recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A method of transmitting a frame by a device in a wireless communication network, the method comprising:

generating a first symbol having a first subcarrier spacing, a symbol duration of the first symbol, excluding a guard interval, having a first length;

generating a second symbol having a second subcarrier spacing narrower than the first subcarrier spacing, a symbol duration of the second symbol, excluding a guard interval, having a second length that is twice the first length;

generating a third symbol, a symbol duration of the third symbol, excluding a guard interval, having a third length that is twice the second length; and transmitting a frame including the first symbol, the second symbol, and the third symbol, wherein the frame includes a legacy preamble part, a HE (high efficiency) long training field that is adapted for use in channel estimation, and a data field, wherein the legacy preamble part includes the first symbol, the HE long training field includes the second symbol, and the data field includes the third symbol, wherein a basic bandwidth of the frame is divided into a plurality of subbands, wherein the data field is encoded per each subband and transmitted, wherein the data field transmitted on a first subband includes data for a first receiving device allocated to the subband, and the method further including:

forming a guard band between the first subband and a second subband in response to the second subband being allocated to a second receiving device, and not forming a guard band between the first subband and the second subband in response to the second subband being allocated to the first receiving device, wherein the second subband is adjacent to the first subband.

2. The method of claim 1, wherein the first length is 3.2 µs and the second length is 6.4 µs.

3. The method of claim 1, wherein generating the second symbol includes:

performing an inverse Fourier transform by using only even-numbered subcarriers among the plurality of subcarriers; and using only one period of two periods that are output by the inverse Fourier transform.

4. The method of claim 1, wherein the third length is 12.8 µs.

5. The method of claim 1, wherein the frame further includes a first HE signal field and a second HE signal field that both follow the legacy preamble part, and wherein the second HE signal field is encoded per the basic bandwidth and transmitted, and includes allocation information of the subbands.

6. The method of claim 5, wherein the second HE signal field further includes information on devices that receive the frame on each subband.

7. The method of claim 1, wherein the basic bandwidth is 20 MHz.

8. The method of claim 1, wherein the legacy preamble part further includes a legacy signal field, and wherein two symbols that immediately follow the legacy signal field are modulated by using BPSK (binary phase shift keying) modulation.

9. A method of receiving a frame by a device in a wireless communication network, the method comprising:

detecting in a frame a first symbol having a first subcarrier spacing, a second symbol having a second subcarrier spacing narrower than the first subcarrier spacing, and a third symbol, a symbol duration of the first symbol, excluding a guard interval, having a first length, a symbol duration of the second symbol, excluding a guard interval, having a second length that is twice the first length, and a symbol duration of the third symbol, excluding a guard interval, having a third length that is twice the second length; and processing the first symbol, the second symbol, and the third symbol in the frame, wherein the frame includes a legacy preamble part, a long training field that follows the legacy preamble part and is adapted for use for channel estimation, and a data field, wherein the legacy preamble part includes the first symbol, the long training field includes the second symbol, and the data field includes the third symbol, wherein the frame further includes a first HE signal field and a second HE signal field that both follow the legacy preamble part, wherein a basic bandwidth of the frame is divided into a plurality of subbands, and the data field is encoded per a subband unit and transmitted on a subband of the plurality of subbands, wherein the second HE signal field is encoded per the basic bandwidth and transmitted, and includes allocation information for the subbands, wherein the data field transmitted on a first subband includes data for a first receiving device allocated to the subband, wherein the frame includes a guard band between the first subband and a second subband when the second subband is allocated to a second receiving device, and wherein the frame does not include the guard band between the first subband and the second subband when the second subband is allocated to the first receiving device, wherein the second subband is adjacent to the first subband.

10. The method of claim 9, wherein processing the first symbol and the second symbol includes:

performing a Fourier transform on the first symbol by using a fast Fourier transform (FFT) having a first size; and performing a Fourier transform on the second symbol by using an FFT having a second size different from the first size.

11. The method of claim 10, wherein the second size is four times the first size, and wherein performing the Fourier transform on the second symbol includes:

generating an interval having two periods by copying an interval excluding a guard interval from the second symbol; and performing the Fourier transform on the interval having the two periods.

12. The method of claim 9, wherein the first length is 3.2 µs and the second length is 6.4 µs.

13. The method of claim 9, wherein the second HE signal field further includes information on devices that receive the frame on each subband.

14. The method of claim 9, wherein the legacy preamble part further includes a legacy signal field, and wherein two symbols that immediately follow the legacy signal field are modulated by using BPSK (binary phase shift keying) modulation.

* * * * *